United States Patent [19]
James

[11] Patent Number: 5,984,718
[45] Date of Patent: Nov. 16, 1999

[54] SAFETY JUMPER CABLES

[76] Inventor: Robert M. James, 814 Moffatt Cir., Simi Valley, Calif. 93065

[21] Appl. No.: 08/936,504

[22] Filed: Sep. 24, 1997

[51] Int. Cl.$^6$ ................................................. H01R 11/00
[52] U.S. Cl. ........................................ 439/504; 439/911
[58] Field of Search .................... 439/504, 911, 439/140

[56] References Cited

U.S. PATENT DOCUMENTS

| | | | |
|---|---|---|---|
| 3,090,871 | 5/1963 | Gorman | 307/10.1 |
| 3,466,453 | 9/1969 | Greenberg | 307/10.1 |
| 3,665,285 | 5/1972 | Mullersman et al. | 320/112 |
| 3,942,027 | 3/1976 | Fima | 307/10.1 |
| 4,079,304 | 3/1978 | Brandenburg | 320/105 |
| 4,163,134 | 7/1979 | Budrose | 200/505 |
| 4,238,722 | 12/1980 | Ford | 320/105 |
| 4,272,142 | 6/1981 | Zapf | 439/504 |
| 4,349,774 | 9/1982 | Farque | 320/105 |
| 4,366,430 | 12/1982 | Wright | 439/504 |
| 4,607,209 | 8/1986 | Guim et al. | 320/105 |
| 4,726,786 | 2/1988 | Hill | 439/504 |
| 4,869,688 | 9/1989 | Merio | 439/504 |
| 4,906,205 | 3/1990 | Viles | 439/504 |
| 4,969,834 | 11/1990 | Johnson | 439/141 |
| 5,174,773 | 12/1992 | Jones | 439/147 |
| 5,438,251 | 8/1995 | Chen et al. | 439/504 |

Primary Examiner—Khiem Nguyen
Assistant Examiner—T C Patel
Attorney, Agent, or Firm—Chase & Yakimo, L.C.

[57] ABSTRACT

A safety jumper cable has two cable segments each with conventional terminal clamps on one end and a coupling on the other end. The terminal clamps are adapted to be secured to the battery terminals in the conventional manner. The cable couplings cannot physically be connected together by means of a positive fail-safe lockout unless the clamps are secured to the proper battery terminals. This lockout is provided by a normally extended, locked safety blade that is slidably mounted within each coupling. When the terminal clamps are attached to the proper battery terminals, the safety blades are unlocked and the safety jumper cable can be coupled together away from either battery and the danger of sparking and explosions. The safety jumper cable may also be provided with a manual override device.

7 Claims, 4 Drawing Sheets

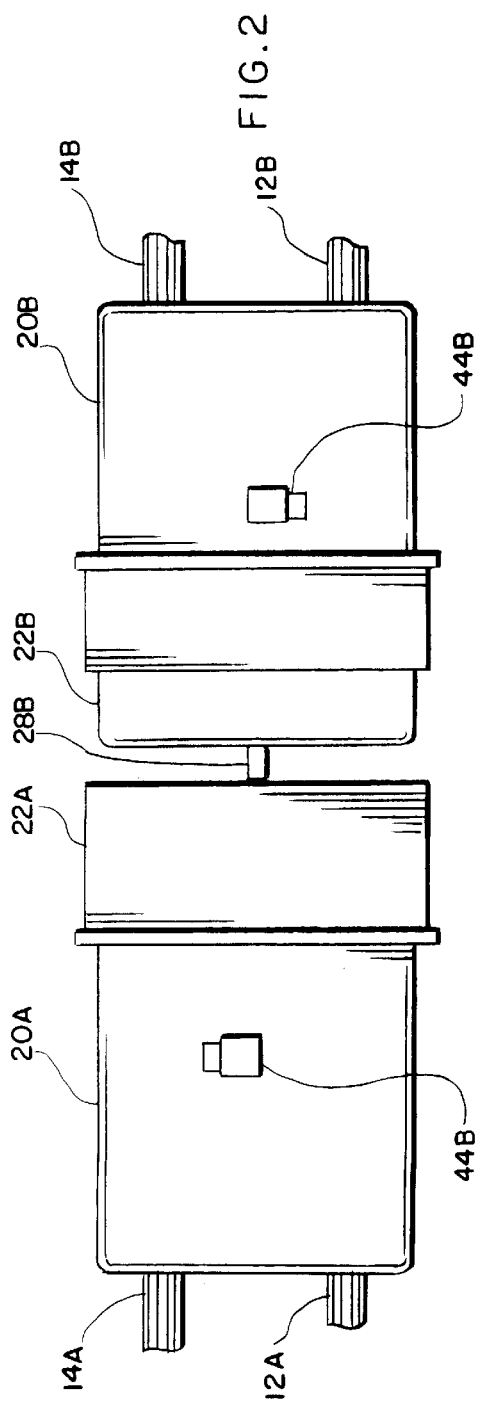
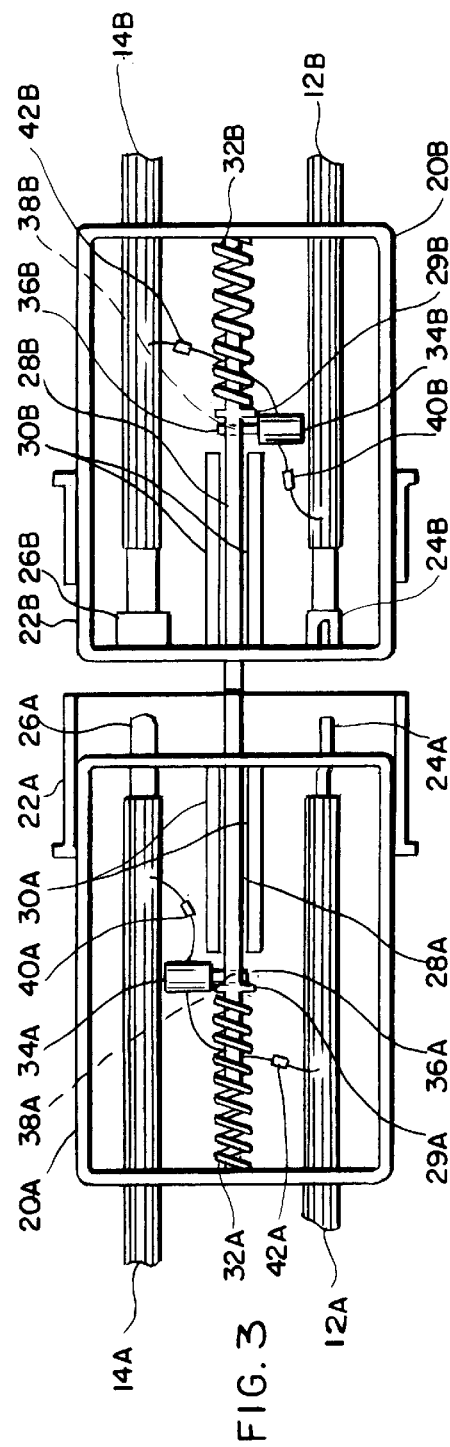

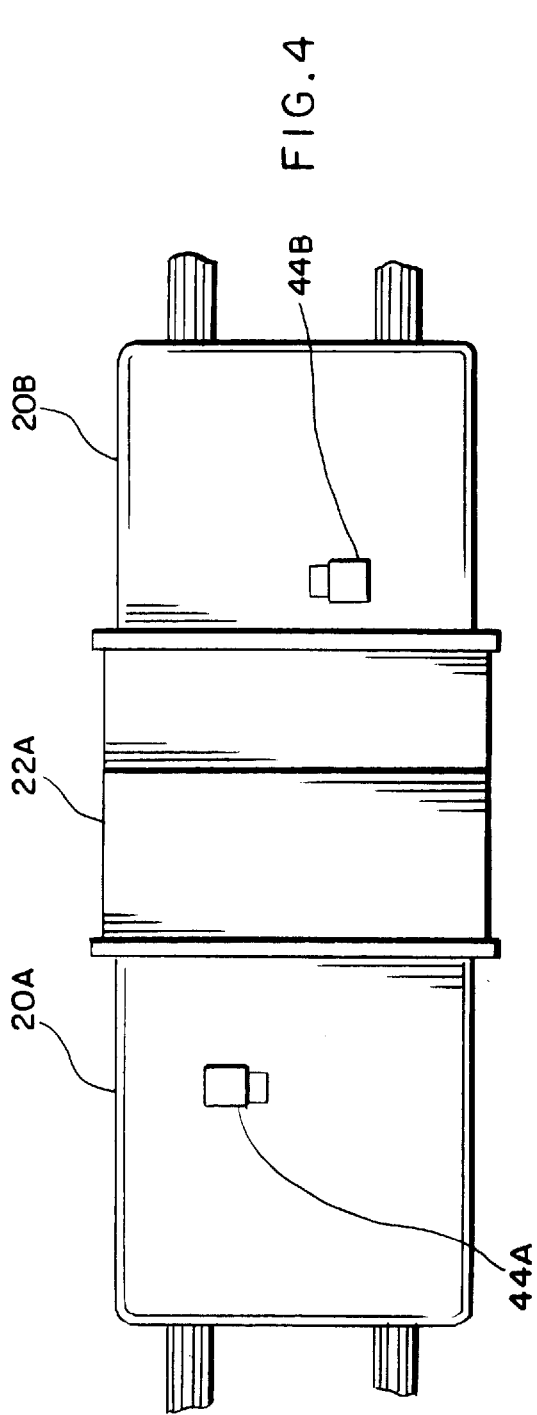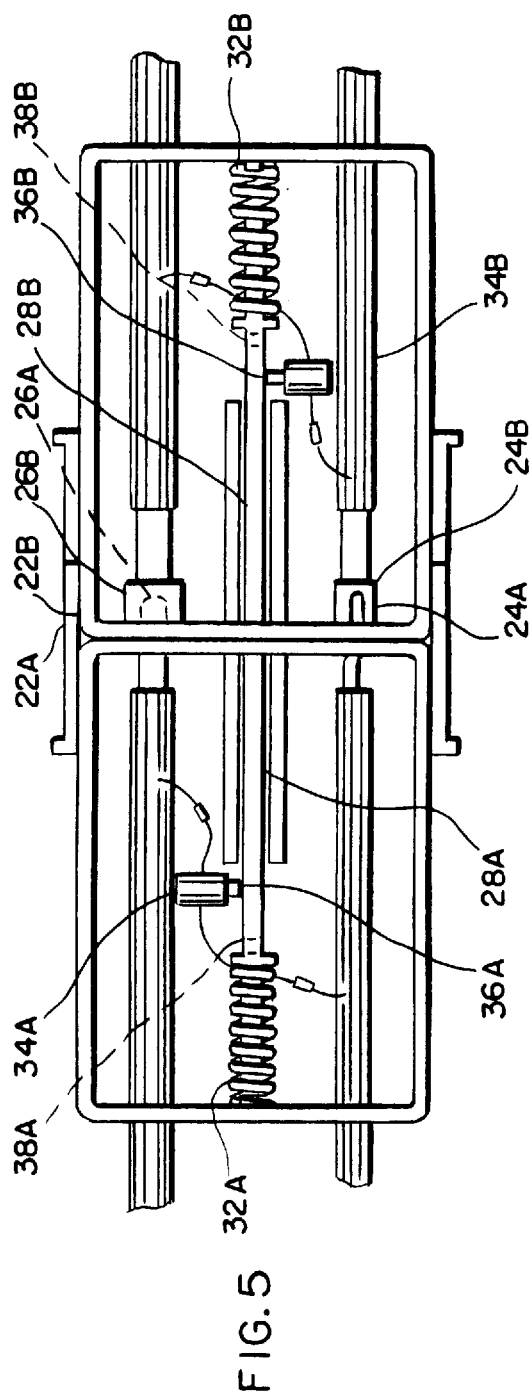

SAFETY JUMPER CABLES

BACKGROUND OF THE INVENTION

This invention pertains to battery jumper cables and, more particularly, to battery jumper cables that utilize a fail-safe positive lockout to prevent incorrect use of the jumper cables.

Jumper cables for use in starting an automobile vehicle having a discharged battery with another vehicle having a charged battery are well known devices.

In the past, jumper cables have generally been constructed of two continuous lengths of insulated wire of suitable gauge which are terminated at their ends with clamps. In use the cables are attached to the charged and discharged batteries to form a circuit to enable the charged battery (commonly referred to as the good battery) to provide the ignition current and voltage for the discharged battery (commonly referred to as the dead battery). Through the use of jumper cables, sometimes referred to as booster cables, a vehicle with a dead battery can be started using a good battery.

There are many risks associated with the use of jumper cables. Automotive batteries and ignition systems involve very high currents and, as a consequence, there exists a danger of electric shock and burns from incorrectly attaching the jumper cables to the battery terminals. Incorrect attachment can also cause the batteries to explode resulting in battery acid burns and other injuries. Additionally, the sparks which can result from connecting the jumper cable clamps to the batteries can ignite hydrogen gas in the vicinity of the batteries causing fire and/or explosion. The dangers and risks involved in using jumper cables are enhanced by the circumstances under which jumper cables are usually used. Although the clamps of the cables may be properly color-coded, proper identification of the negative and positive terminals is made difficult in poorly lit environments with poorly marked battery terminals that have become obscured by age, dirt and grime.

Enhancements to jumper cables have been proposed in order to aid in correctly attaching the cables to the batteries by utilizing lights and a remote connection point. One such jumper cable is shown in U.S. Pat. No. 4,272,142 to Zapf. However, in general such prior improvements do not positively prevent incorrect connection of the batteries.

Accordingly it is desirable to provide a safety jumper cable that utilizes a fail-safe positive lockout to prevent incorrect connection of the batteries.

SUMMARY OF THE INVENTION

It is therefore the primary object of the present invention to provide a set of jumper cables that includes a slidably mounted, normally extended and locked safety blade tag prevent incorrect connection between the batteries.

Another important object of the present invention is to provide a fail-safe mechanism to prevent incorrect connection.

Still another object of the present invention is to eliminate sparking in the vicinity of the batteries while attaching the clamps to the batteries to prevent explosions.

These objects are accomplished by providing two cable elements with conventional terminal clamps on one end and a coupling on the other end. The terminal clamps are adapted to be secured to the battery terminals in the conventional manner. The cable element couplings cannot physically be connected together by means of a positive fail-safe lockout unless the clamp elements are secured to the proper battery terminals. This lockout is provided by a normally extended, locked safety blade that is slidably mounted within the couplings. When the terminal clamps are attached to the proper battery terminals, the safety blade is unlocked and the safety jumper cable can be coupled together away from either battery and the danger of sparking and explosions. The safety jumper cables may also be provided with a manual override device.

BRIEF DESCRIPTION OF THE DRAWINGS

FIG. 2 is a plan view of the safety jumper cables couplings shown disengaged.

FIG. 3 is a plan view of the internal details of the couplings when positively locked out of engagement.

FIG. 4 is a plan view of the couplings shown engaged.

FIG. 5 is a plan view of the internal details of the couplings when engaged.

DETAILED DESCRIPTION OF THE PREFERRED EMBODIMENT

Figure 1:
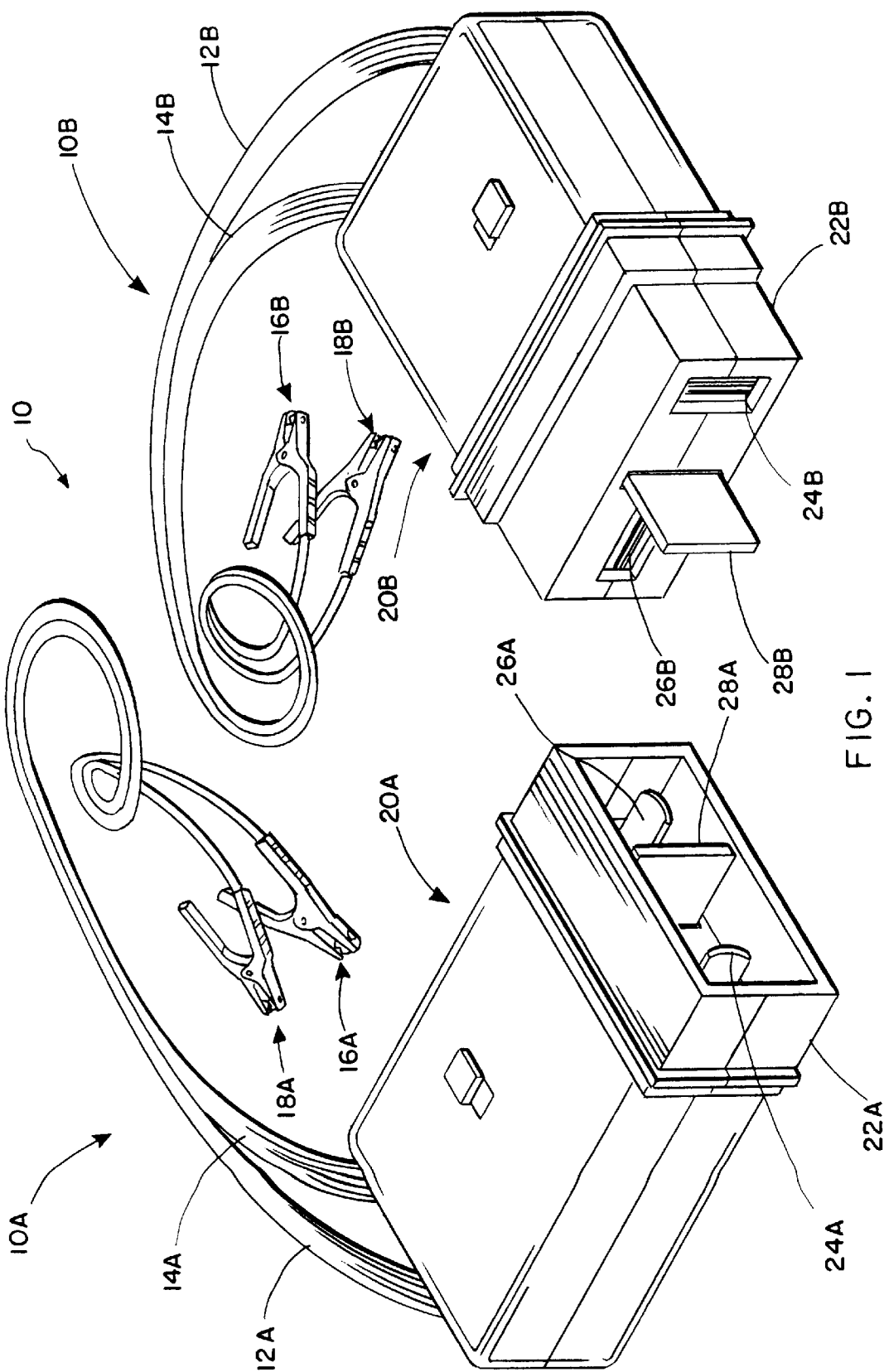
FIG. 1 is perspective view of the safety jumper cables.

Turning more particularly to the drawings, FIG. 1 illustrates a fail-safe jumper cable 10 consisting of cable segments 10A and 10B. Cable segment 10A and its related components will primarily be described hereafter, it being understood that cable segment 10B will have similar components identified by similar numbers followed by the letter "B".

Cable segment 10A includes insulated positive cable element 12A and insulated negative cable element 14A. A conventional terminal clamp 16A is secured to one end of cable element 12A and conventional terminal clamp 18A is secured to one end of cable element 14A. Cable elements 12A and 14A are secured at their opposite ends within coupling 20A.

Coupling 20A has a socket 22A at the front end thereof. Socket 22A is shaped to accept a plug 22B, which is formed at the front end of coupling 20B. Socket 22A also protects conductive prongs 24A and 26A attached to the ends of cable elements 12A and 14A, respectively, within coupling 20A. Prongs 24A and 26A extend from coupling 20A. More specifically, prong 24A is flat and vertically mounted in coupling 20A and prong 26A is horizontally mounted in coupling 20A, as viewed in FIG. 1.

Female receptacles 24B and 26B are attached to the ends of cable elements 12B and 14B, respectively, within coupling 20B. Receptacle 24B is vertically mounted and receptacle 26B is horizontally mounted in coupling 20B to correspond to the positioning and orientation of prongs 24A and 26A. This mounting arrangement ensures that couplings 20A and 20B will fit together in only one orientation.

As shown in FIGS. 1 and 2, a retractable safety blade 28A extends from coupling 20A within socket 22A between prongs 24A and 26A. A retractable safety blade 28B extends from plug 22B of coupling 20B between receptacles 24B and 26B.

As shown in FIG. 3, safety blade 28A is slidably mounted in coupling 20A between a pair of guides 30A. The guides 30A are fixedly mounted to the top and bottom walls of coupling 20A between prongs 24A and 26A with one end adjacent the front wall of coupling 20A. A spring 32A, normally mounted in its fully expanded condition with one end engaging the rear wall of coupling 20A and the other end engaging a shoulder 29A extending from safety blade 28A, keeps safety blade 28A normally extended from coupling 20A. A solenoid 34A with core 36A is mounted perpendicular to safety blade 28A in coupling 20A. Core 36A normally extends through a hole 38A in safety blade 28A to positively lock safety blade 28A in the extended position when solenoid 34A is not energized. Hole 38A is preferably formed adjacent the shoulder 29A, opposite the spring 32A.

Figure 6:
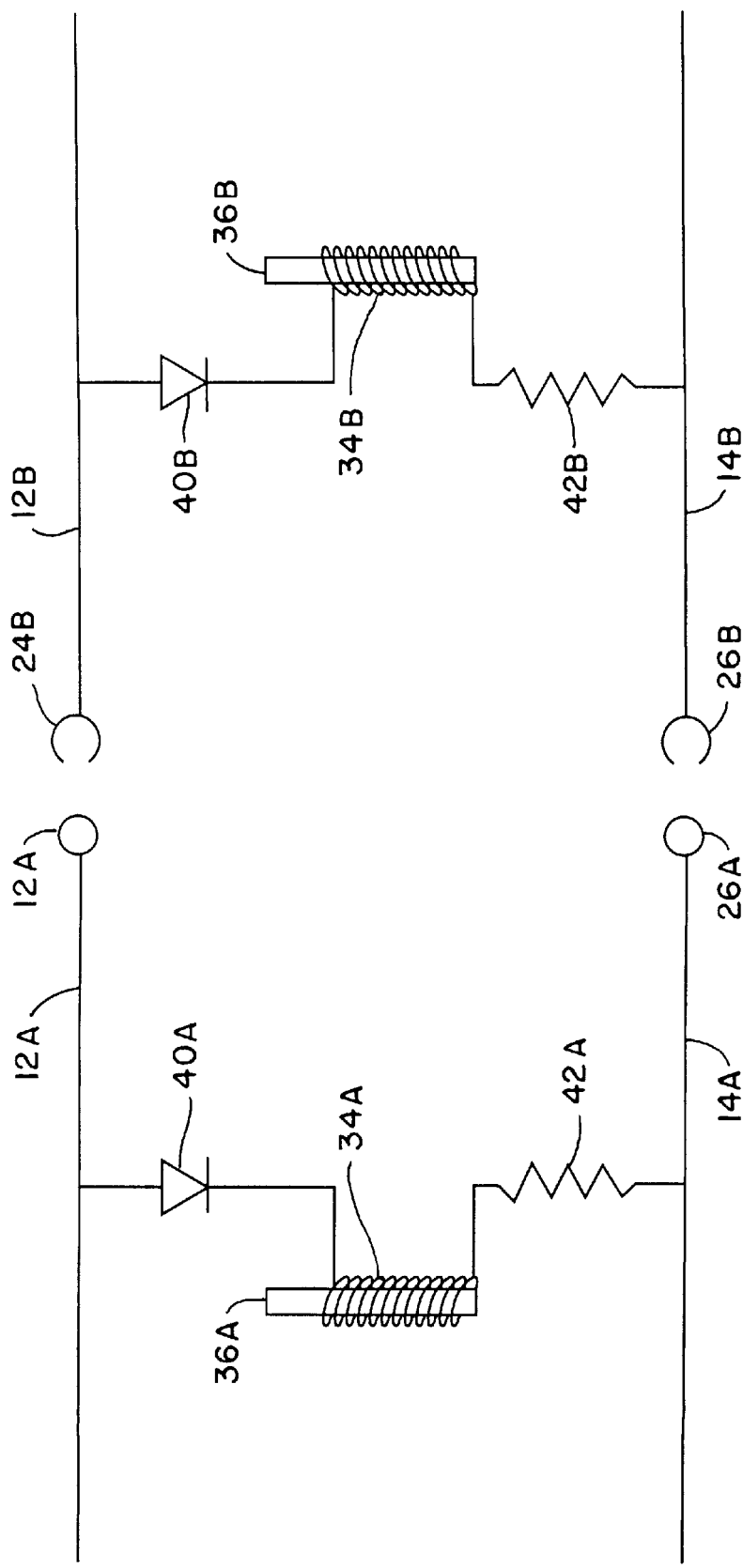
FIG. 6 is a diagram of the lockout circuit.

As shown in FIG. 6, diode 40A prevents solenoid 34A from becoming energized and retracting core 36A from hole 38A unless terminal clamp 16A is properly attached to a positive battery terminal (not shown) and terminal clamp 18A is attached to a negative battery terminal (not shown). A resistor 42A in series with diode 40A and solenoid 34A limits the current to solenoid 34A.

FIGS. 4 and 5 show couplings 20A and 20B mated together. When terminal clamps 16A and 18A are properly attached to the positive and negative terminals respectively of the good battery, solenoid 34A is energized and core 36A is retracted from hole 38A unlocking safety blade 28A. Likewise, when terminal clamps 16B and 18B are properly attached to the positive and negative terminals respectively of the dead battery, solenoid 34B is energized and core 36B is retracted from hole 38B unlocking safety blade 28B.

With the terminal clamps 16A and 16B and 18A and 18B properly attached to the batteries, when plug 22B is inserted into socket 22A, safety blades 28A and 28B are aligned and the ends thereof contact one another and are slidably pushed or forced into couplings 20A and 20B between guides 30A and 30B respectively. Thus, springs 32A and 32B are compressed. This allows prong 24A to engage receptacle 24B and prong 26A to engage receptacle 26B completing the connection between the good and the dead battery. Any sparking that may result is safely within socket 22A and away from either battery and the potential for explosion.

After the dead battery is recharged and couplings 20A and 20B are disengaged, terminal clamps 16A and 16B and 18A and 18B are removed from the batteries. In doing so, solenoids 34A and 34B are deenergized. Blades 28A and 28B are forced by the expansion of springs 32A and 32B to slide outwardly between guides 30A and 30B into the position shown in FIG. 3. The solenoid cores 36A and 36B extend and return into holes 38A and 38B of blades 28A and 28B to again positively lock out and prevent an improper connection between couplings 20A and 20B.

FIGS. 2 and 4 show manual override slides 44A and 44B on couplings 20A and 20B which are attached within the couplings to solenoid cores 36A and 36B respectively to manually move the cores from their extended positions to their retracted positions. Thus, if the dead battery is so discharged such that it will not energize solenoid 34A or 34B, the operator, after carefully assuring that terminal clamps 16A, 18A, 16B and 18B are attached to the correct battery terminals, can manually move solenoid 36A or 36B from its extended position locking safety blade 28A or 28B, to its retracted position unlocking safety blade 28A or 28B. Couplings 10A and 10B can now be engaged to jump the dead battery.

It is to be understood that while a certain form of this invention has been illustrated and described, it is not limited thereto except insofar as such limitations are included in the following claims and allowable equivalents thereof.

Having thus described the invention, what is claimed as new and desired to be secured by Letters Patent is as follows:

1. A jumper cable, comprising:

a first and second electrical cable member having opposed ends;

said first electrical cable member including:
  a positive cable element and a negative cable element;
  a pair of terminal clamps electrically connected to one end of said first electrical cable member;
  a first coupling on the other end of said first electrical cable member;

said second electrical cable member including:
  a positive cable element and a negative cable element;
  a pair of terminal clamps electrically connected to one end of said second electrical cable member;
  a second coupling on the other end of said second electrical cable member;

said first and second couplings adapted to be connected together to effect the electrical connection between said first and second cable members;

said first and second couplings having a lockout means for preventing physical and electrical connection between said first and second electrical cable members;

said lockout means in said couplings including:
  a blade slidably mounted in said coupling having an aperture;
  a solenoid having a core normally extending into said aperture to positively lock said blade;
  a diode electrically connected to said solenoid for permitting flow of current between said positive and negative cable elements in one direction to energize said solenoid and unlock said blade to allow physical and electrical connection between said first and second couplings.

2. The jumper cable as claimed in claim 1 wherein said terminal clamps are connected to the electrical circuit of separate vehicles, and said couplings are secured together at a point between said vehicles.

3. A jumper cable, comprising:

a first and second electrical cable member having opposed ends;

said cable members each including:
  a positive cable element and a negative cable element;
  a pair of terminal clamps electrically connected to one end of each said electrical cable members;
  a coupling on the other end of each said cable members;

said first and second couplings adapted to be connected together to effect the electrical connection between said first and second cable members;

at least one of said couplings having a lockout means for preventing connection between said first and second electrical cable members;

said lockout means including:
  a blocking member movably mounted in said coupling for movement between a first locked position and a second unlocked position, said blocking member having an aperture therein;
  a normally deenergized solenoid electrically connected to said cable elements and having a core, said core extending into said aperture when said solenoid is deenergized to lock said blocking member in said locked position and said core retracting from said aperture when said solenoid is energized to allow said blocking member to move to said unlocked position and allow connection between said first and second couplings.

4. A jumper cable as claimed in claim 3 wherein both said couplings have said lockout means.

5. A jumper cable as claimed in claim 3 wherein said lockout means includes a diode electrically connected to said solenoid for permitting current flow between said positive and negative cable elements in one direction to energize said solenoid.

6. A jumper cable as claimed in claim 3 wherein said blocking member is a bar slidably mounted between guide members, said members fixedly mounted to said coupling.

7. A jumper cable as claimed in claim 3 wherein said lockout means includes a spring mounted at one end to said coupling and at another end to said blocking member, said spring retracting when said blocking member moves to said second unlocked position to bias said blocking member into said locked position upon disconnection of said couplings and deenergization of said solenoid.

\* \* \* \* \*